(12) United States Patent
Yamamoto et al.

(10) Patent No.: US 7,929,105 B2
(45) Date of Patent: Apr. 19, 2011

(54) LIQUID CRYSTAL DISPLAY DEVICE

(75) Inventors: Takashi Yamamoto, Chiba (JP); Akira Ishii, Mobara (JP); Yoshihiro Arai, Mobara (JP); Aki Tsuchiya, Mobara (JP)

(73) Assignee: Hitachi Displays, Ltd., Tokyo (JP)

( * ) Notice: Subject to any disclaimer, the term of this patent is extended or adjusted under 35 U.S.C. 154(b) by 77 days.

(21) Appl. No.: 12/283,082

(22) Filed: Sep. 9, 2008

(65) Prior Publication Data
US 2009/0079927 A1 Mar. 26, 2009

(30) Foreign Application Priority Data

Sep. 12, 2007 (JP) ................................. 2007-236680

(51) Int. Cl.
*G02F 1/1339* (2006.01)
(52) U.S. Cl. ......................... 349/155; 349/156
(58) Field of Classification Search ........................ None
See application file for complete search history.

(56) References Cited

U.S. PATENT DOCUMENTS

| | | | |
|---|---|---|---|
| 7,432,717 B2 * | 10/2008 | Frederick et al. ............. | 324/414 |
| 7,609,357 B2 * | 10/2009 | Kim ............................. | 349/156 |
| 2004/0114087 A1 * | 6/2004 | Cho et al. ..................... | 349/155 |
| 2004/0183991 A1 * | 9/2004 | Kuo .............................. | 349/155 |
| 2004/0223109 A1 * | 11/2004 | Taniguchi et al. ............ | 349/156 |
| 2005/0190338 A1 | 9/2005 | Lim | |
| 2005/0270471 A1 | 12/2005 | Kitagawa et al. | |

FOREIGN PATENT DOCUMENTS

| | | |
|---|---|---|
| JP | 2005-242310 | 9/2005 |
| JP | 2005-345819 | 12/2005 |

\* cited by examiner

*Primary Examiner* — Tina M Wong
(74) *Attorney, Agent, or Firm* — Milbank, Tweed, Hadley & McCloy

(57) ABSTRACT

To prevent inconsistency in images and support columns from collapsing when pressure is applied from outside in the case where liquid crystal is sealed in under negative pressure in order to prevent impact bubbles from being created in the liquid crystal display device in accordance with a liquid crystal dropping and sealing method.

The distance between a TFT substrate 10 and a facing substrate 20 is set using first support columns 30, while second support columns 40 are located within contact holes 50 and do not make contact with the TFT substrate 10. When pressure is applied from outside, the second support columns 40 make contact with the side wall or the like of the contact holes 50 created in the TFT substrate 10, so that the repulsive force of the second support columns 40 prevents the distance between the TFT substrate 10 and the facing substrate 20 from becoming too small. As a result, inconsistency in images can be prevented, and the first support columns 30 can be prevented from collapsing when pressure is applied from outside.

10 Claims, 12 Drawing Sheets

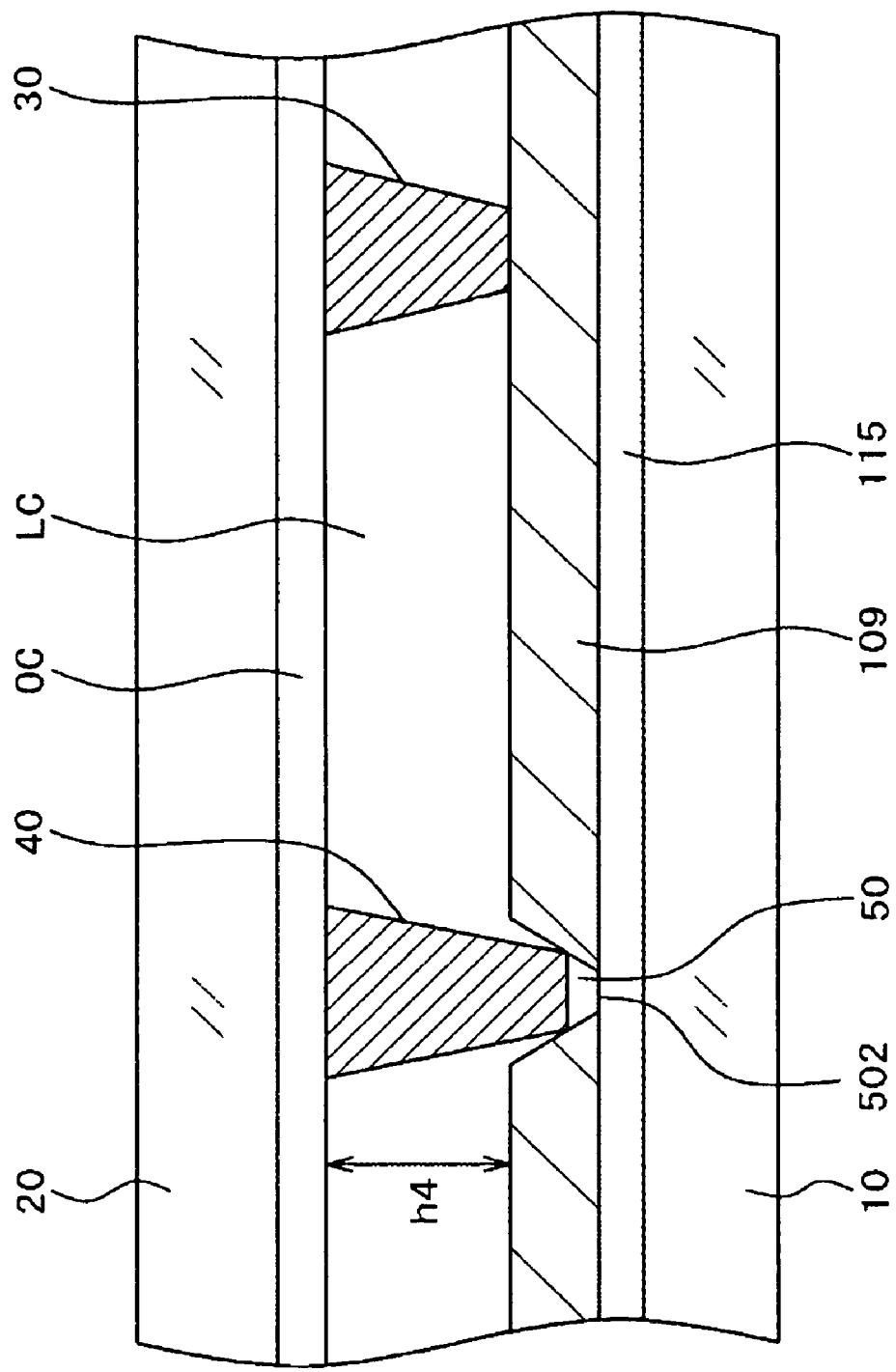

A-A

B-B'

C - C'

D – D'

LIQUID CRYSTAL DISPLAY DEVICE

The present application claims priority from Japanese application JP2007-236680 filed on Sep. 12, 2007, the content of which is hereby incorporated by reference into this application.

BACKGROUND OF THE INVENTION (1) Field of the Invention

The present invention relates to a liquid crystal display device and to a technology for adjusting the distance between a TFT substrate and a facing substrate using a spacer in a configuration where the space between the TFT substrate and the facing substrate is filled in with liquid crystal in accordance with a liquid crystal dropping and sealing method.

(2) Related Art Statement

In liquid crystal display devices, the space between the TFT substrate on which pixel electrodes and thin film transistors (TFT's) are formed and the facing substrate where color filters and the like are formed is filled in with liquid crystal, and an image is formed by controlling the molecules in this liquid crystal using an electrical field. The distance between the TFT substrate and the facing substrate is as small as several microns. In accordance with conventional methods for filling in the space between the substrates with liquid crystal, the space between the TFT substrate and the facing substrate is sealed with a sealing material and the inside made a vacuum, and liquid crystal is injected through an inlet for liquid crystal provided in a portion of the sealing material using the ambient pressure.

When the distance between the TFT substrate and the facing substrate is small and the display area of the liquid crystal display device is large, however, it takes a long time to inject liquid crystal, making the throughput in the manufacture longer, and thus increasing the cost of manufacture. As a measure against this, a technology where a necessary amount of liquid crystal is dropped on a facing substrate (or TFT substrate) where a sealing material is formed in closed annular form in the periphery portion, and after that the TFT substrate (or facing substrate) is pasted to the other substrate so that the liquid crystal is sealed in (liquid crystal dropping and sealing method) has been developed.

The distance between the TFT substrate and the facing substrate is kept constant by dispersing small beads according to the prior art. In the case where beads are dispersed in accordance with a liquid crystal dropping and sealing method, however, beads move when liquid crystal is dropped, causing there to be places with many beads and places with few beads. Thus, the distance between the TFT substrate and the facing substrate becomes inconsistent. When the distance between the TFT substrate and the facing substrate becomes inconsistent, such a problem arises that the contrast of images in the liquid crystal display device lowers and the pixels become inconsistent.

Meanwhile, a method for forming support columns of an organic film on the facing substrate (support column method) has been developed as a method for controlling the distance between the TFT substrate and the facing substrate. The support columns are secured to the facing substrate, and therefore, do not move when liquid crystal is dropped onto the substrate. Accordingly, the method for controlling the distance using support columns is appropriate in the method for dropping liquid crystal (liquid crystal dropping and sealing method).

A number of conductive layers for forming TFT's, video signal lines, scanning lines, electrodes and the like are formed on the TFT substrate, and contact holes for connecting conductive layers are created. The portions where the contact holes are created are recesses. Meanwhile, the support columns are formed on the facing substrate. When the support columns enter the contact hole portions, the distance between the TFT substrate and the facing substrate cannot be kept constant. "Patent Document 1" describes a configuration where there are support columns which engage or do not engage with contact holes. "Patent Document 1" describes that it is better for the support columns not to enter into contact holes, but even in the case where some support columns do enter into contact holes, due to the TFT substrate and the facing substrate shifting in position, the remaining support columns, which do not enter into contact holes, keep the distance between the TFT substrate and the facing substrate constant. In "Patent Document 1," the contact hole portions ideally do not to have a support column, and therefore, support columns are located in the peripheral portion of the contact holes, even in the case where there are some support columns in contact portions.

In addition to contact holes portions on the TFT substrate, protrusions are formed in portions where wires cross, and thus, the surface is not flat. "Patent Document 2" describes a configuration where support columns of a constant height are formed on the facing substrate so that some support columns make contact with flat portions on the TFT substrate and other support columns make contact with protrusions. That is to say, some support columns are compressed by the height of protruding wires and the like, so that the degree of compression functions as a so-called gravity margin. In this case, the amount by which the support columns are compressed is approximately 200 nm to 600 nm.

(Patent Document 1) Japanese Unexamined Patent Publication 2005-345819 (Corresponding U.S. Application US2005/0270471 A1)

(Patent Document 2) Japanese Unexamined Patent Publication 2005-242310 (Corresponding U.S. Application US2005/0190338 A1)

SUMMARY OF THE INVENTION

Problem to be Solved by the Invention

In the liquid crystal dropping and sealing method, the amount of liquid crystal dropped is very important. When liquid crystal is dropped, a sealing portion is formed of a sealing material in the periphery of the TFT substrate. Liquid crystal is dropped inside the sealing portion on the facing substrate (or TFT substrate), which is then covered with the TFT substrate (or facing substrate), so as to be pasted to the TFT substrate (or facing substrate) through the sealing portion. Hereinafter, the portion formed of the TFT substrate, the facing substrate, the sealing portion and the liquid crystal is referred to as liquid crystal cell. At this time, in the case where too much liquid crystal is dropped onto the substrate, the liquid crystal gets into the connection portion between the sealing portion and the TFT substrate or facing substrate, thus causing a defect in sealing.

Accordingly, the amount of liquid crystal dropped is small, so that the liquid crystal cell is formed under such conditions that the pressure within the liquid crystal cell is negative. In the case where a liquid crystal cell is formed under such conditions that there is too little liquid crystal, however, impact bubbles are created at low temperatures and high temperatures due to inconsistency in the manufacture. As a measure against the creation of impact bubbles, there is a method for reducing the density of support columns. When the density of support columns is reduced, the support columns are easily compressed under the ambient pressure, and thus, a configuration which makes it difficult for bubbles to be created can be provided.

In the case where the density of support columns is low, and the TFT substrate or facing substrate is pressed, there is inconsistency in the display. That is to say, the distance between the TFT substrate and the facing substrate easily changes due to the low density of the support columns. Furthermore, in the case where the TFT substrate or facing substrate is pressed, the low density of the support columns makes the stress per support column large, and therefore, in some cases support columns collapse, and in such cases, the space does not return to its original form and becomes a permanent defect.

An object of the present invention is to prevent sealing defects relating to the amount of liquid crystal in the liquid crystal dropping and sealing method, and to provide measures against the above described problem in the case where the space between the TFT substrate and the facing substrate is sealed under such conditions that the pressure is negative.

Means for Solving Problem

According to the present invention, first support columns and second support columns are formed on the facing substrate. The first support columns make contact with the TFT substrate and the second support columns are formed in locations corresponding to contact hole portions on the TFT substrate. In a normal state, the first support columns keep the distance between the TFT substrate and the facing substrate constant. The first support columns are compressed in a normal state, and therefore make sealing possible in such a state that the pressure is negative, and thus, bubbles can be prevented from being created due to impact.

Meanwhile, the second support columns correspond to the contact holes, and therefore do not make contact with the TFT substrate in a normal state. In the case where some TFT's are pressed, however, the second support columns make contact with the wall portion of the contact holes. Thus, the second support columns are also compressed, so as to create a repulsive force which prevents the distance between the TFT substrate and the facing substrate from becoming too short. Accordingly, there is no inconsistency in the display and the first support columns do not collapse. Concretely, the configuration is as follows.

(1) A liquid crystal display device having a first substrate, a second substrate and liquid crystal sandwiched between the above described first substrate and the above described second substrate, characterized in that the above described first substrate has contact holes in truncated, conical form, the above described second substrate has first support columns and second support columns, the above described first support columns make contact with the above described first substrate, the above described second support columns do not make contact with the above described first substrate, the end of at least one of the above described second support columns is located within said contact hole in a plan view and the minimum distance between the end of the second support column and the rim of the contact hole is 5 μm or more in a plan view, and the distance between the end of the above described second support column and the bottom of the above described contact hole is 0.3 μm to 3 μm.

(2) The liquid crystal display device according to (1), characterized in that the distance between the end of the above described second support column and the bottom of the above described contact hole is 0.5 μm to 1 μm.

(3) The liquid crystal display device according to (1) or (2), characterized in that the number of the above described second support columns is greater than the number of the above described first support columns.

(4) The liquid crystal display device according to any of (1) to (3), characterized in that the diameter of the above described first support columns is greater than the diameter of the above described second support columns.

(5) The liquid crystal display device according to any of (1) to (4), characterized in that the above described second support columns make contact with the side or the bottom of the above described contact holes when the above described first substrate or the above described second substrate receives pressure from the outside.

(6) A liquid crystal display device having a first substrate, a second substrate and liquid crystal that is sealed in between the above described first substrate and the above described second substrate in accordance with a liquid crystal dropping and sealing method, characterized in that the above described first substrate has contact holes in truncated, conical form, the above described second substrate has first support columns and second support columns, the above described first support columns make contact with the above described first substrate, the above described second support columns do not make contact with the above described first substrate, the end of at least one of the above described second support columns is located within said contact hole in a plan view and the minimum distance between the end of the second support column and the rim of the contact hole is 5 μm or more in a plan view, and the distance between the end of the above described second support column and the bottom of the above described contact hole is 0.3 μm to 3 μm.

(7) The liquid crystal display device according to (6), characterized in that the above described first support columns are in such a state as to be compressed by the above described first substrate and the above described second substrate.

(8) The liquid crystal display device according to (6) or (7), characterized in that the height of the above described second support columns is greater than the distance between the above described first substrate and the above described second substrate.

(9) The liquid crystal display device according to any of (6) to (8), characterized in that the distance between the end of the above described second support columns and the bottom of the above described contact holes is 0.5 μm to 1 μm.

(10) The liquid crystal display device according to any of (6) to (9), characterized in that the number of the above described second support columns is greater than the number of the above described first support columns.

(11) The liquid crystal display device according to any of (6) to (10), characterized in that the diameter of the above described first support columns is greater than the diameter of the above described second support columns.

(12) The liquid crystal display device according to any of (6) to (11), characterized in that the above described second support columns make contact with the side or the bottom of the above described contact holes when the above described first substrate or the above described second substrate receives pressure from the outside.

Effects of the Invention

According to the present invention, the first support columns are compressed, so that liquid crystal can be sealed in in such a state that the pressure is negative, and thus, bubbles can be prevented from being created due to impact. In addition, in the case where pressure is applied to the facing substrate of the TFT substrate from the outside, the second support columns make contact with the side or the like of the contact holes created in the TFT substrate, and thus, the repulsive force increases and prevents the distance between the TFT substrate and the facing substrate from becoming too small, so that inconsistency in images due to pressure from the outside can be prevented. Furthermore, the distance between the TFT substrate and the facing substrate can be prevented from becoming too small for the same reasons, and therefore, the first support columns can be prevented from collapsing.

In addition, the contact holes are in truncated, conical form and the distance between the second support columns and the bottom of the contact holes is 0.3 µm to 3 µm, preferably 0.5 µm to 1 µm, and thus, it is easy to design the contact holes so that the repulsive force gradually increases as pressure from the outside increases. That is to say, it becomes possible to design the contact holes so that the angle of the taper of the side and the depth of the contact holes are such that a repulsive force corresponding to the degree to which the facing substrate or TFT substrate bends due to the pressure from the outside is created from the second support columns.

BRIEF DESCRIPTION OF THE DRAWINGS

FIG. 2 is another cross sectional diagram illustrating the principle of the present invention.

EXPLANATION OF SYMBOLS

Figure 1:
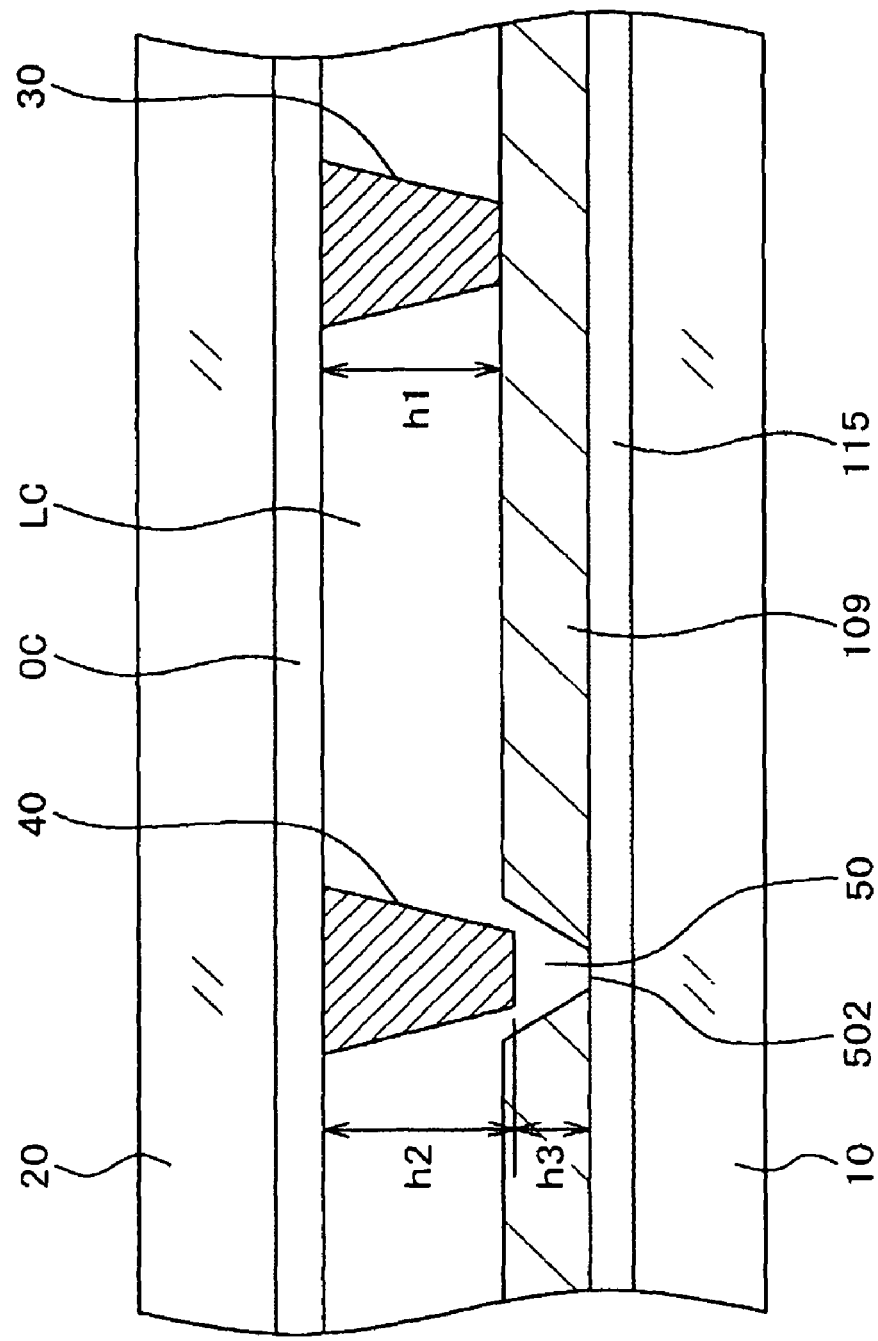
FIG. 1 is a cross sectional diagram illustrating the principle of the present invention.

10 . . . TFT substrate
20 . . . facing substrate
30 . . . first support column
40 . . . second support column
50 . . . contact hole
60 . . . SD contact hole
101 . . . first base film
102 . . . second base film
103 . . . semiconductor layer
104 . . . gate insulating film
105 . . . gate electrode
106 . . . interlayer insulating film
107 . . . SD electrode
108 . . . passivation film
109 . . . flattened film
110 . . . common electrode
111 . . . interlayer insulating film
112 . . . pixel electrode
115 . . . TFT layer
401 . . . end of second support column
402 . . . base of second support column
501 . . . rim of contact hole
502 . . . bottom of contact hole
1051 . . . scanning line
1071 . . . video signal line
BM . . . black matrix
RCF . . . red color filter
GCF . . . green color filter
BCF . . . blue color filter
OC . . . overcoat film
LC . . . liquid crystal

DETAILED DESCRIPTION OF THE INVENTION

Best Mode for Carrying Out the Invention

The contents of the present invention are disclosed in detail in reference to the figures. FIGS. 1 and 2 are schematic cross sectional diagrams illustrating the principle of the present invention. In FIG. 1, there is a TFT layer 115 made up of a number of layers, on top of a TFT substrate 10. A base film, a semiconductor layer, an insulating layer, source drain electrodes (SD electrodes) and the like are collectively referred to as TFT layer 115 in FIGS. 1 and 2. That is to say, the TFT layer 115 includes all the layers beneath a flattened film (insulating film) 109. The flattened film 109 is formed on the TFT layer 115. Though in the TFT layer 115 a passivation film (insulating film) for protection is formed over the TFT's, video signal lines, scanning lines and the like, the top of the passivation film is uneven. The flattened film 109 is formed in order to make the surface on which pixel electrodes and the like are formed flat. The flattened film 109 is generally formed of an organic insulating film, such as of acryl, and the thickness is approximately 1 µm to 3 µm. Though the pixel electrodes and the like are formed on the flattened film 109, contact holes 50 are created in the flattened film 109, so that the pixel electrodes can make electrical connection with the wires or electrodes in the lower layer.

A facing substrate 20 is provided so as to face the TFT substrate 10. Though a black matrix (light blocking film), color filters, an overcoat film (insulating film) and the like are formed on the facing substrate 20, the black matrix, color filters and the like are not shown, and only the overcoat film OC is shown in FIGS. 1 and 2. First support columns 30 and second support columns 40 are formed on the overcoat film OC. The space between the TFT substrate 10 and the facing substrate 20 is filled in with liquid crystal LC.

In FIG. 1, the distance between the TFT substrate 10 and the facing substrate 20 is h1. This distance is controlled using the first support columns 30. Though the height of the first support columns 30 is originally the same as the height h2 of the second support columns 40, the first support columns 30 are compressed, so that the height is reduced from h2 to h1, because the liquid crystal cell is sealed under such conditions that the pressure is negative. The second support columns 40 are provided in such locations as to correspond to the contact holes 50. In the state in FIG. 1, the second support columns 40 are not compressed and retain their original height h2. In FIG. 1, the distance between the second support column 40 and the TFT layer 115 is 0.3 μm to 3 μm, preferably 0.5 μm to 1 μm. Here, to be precise, the distance between the second support column 40 and the TFT layer 115 is the distance between the second support column 40 and the bottom 502 of the contact hole 50 in the flattened film 109.

FIG. 2 shows a case where pressure is applied to the liquid crystal display device from the outside in the state in FIG. 1, so that the distance between the TFT substrate 10 and the facing substrate 20 is reduced to h4. This is a state where the second support column 40 makes contact with the side wall of the contact hole 50. That is to say, FIG. 2 shows the state when the second support column 40 makes contact with the side wall of the contact hole 50 and a repulsive force starts being created from the second support column 40. In FIG. 2, the height of the first support column 30 is h4. That is to say, the first support column 30 is compressed, so that the height is reduced to h4 from h2. If no repulsive force is created from the second support column 40, the first support column 30 is further compressed, so that the distance between the TFT substrate and the facing substrate 20 is further reduced. Thus, when the degree to which the first support column 30 is compressed exceeds the limit, the first support column 30 collapses and the liquid crystal display device becomes permanently defective. FIG. 2 shows that the distance between the TFT substrate 10 and the facing substrate 20 can be prevented from becoming too small and the first support column 30 can be prevented from collapsing when the second support column 40, which is provided in the contact hole 50, makes contact with the side wall of the contact hole 50.

Figure 3A:
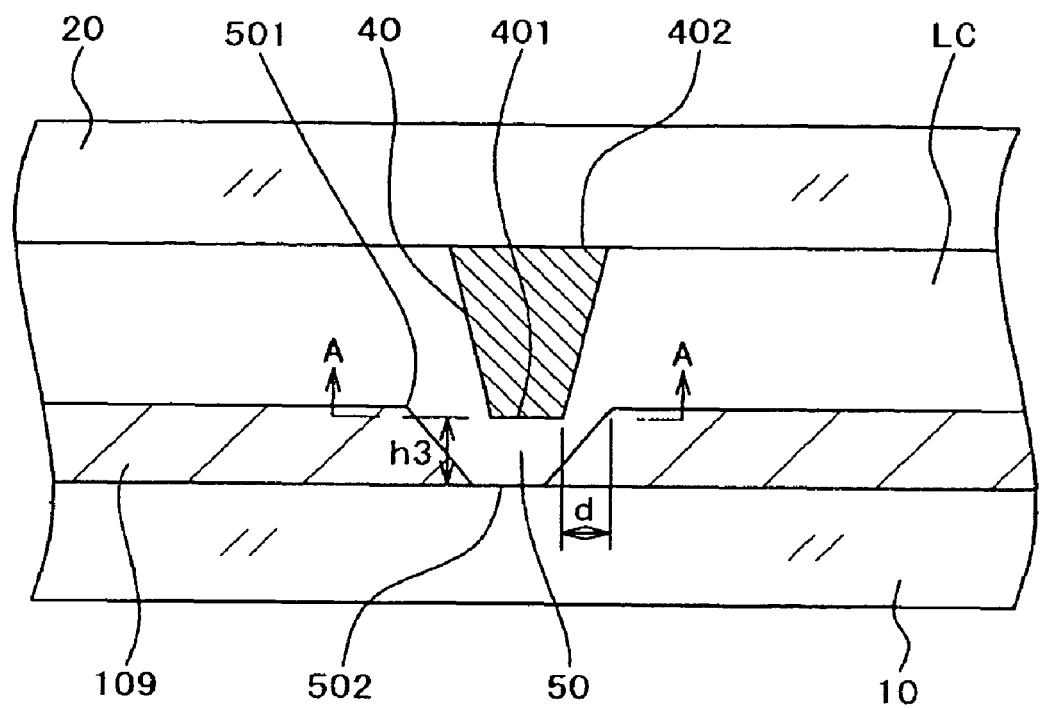
FIGS. 3A and 3B are a cross sectional diagram showing the positional relationship between the second support columns and the contact columns.
Figure 3B:
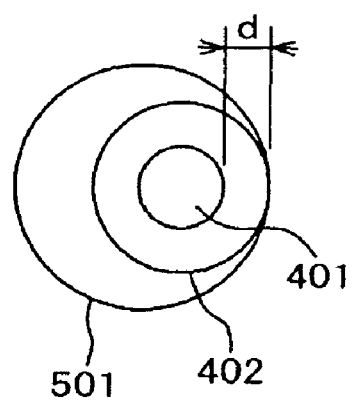

FIGS. 1 and 2 show the principle of the present invention, and the second support column 40 is provided in the center portion of the contact hole 50. In addition, the diameter of the contact hole 50 is drawn smaller than actual size. FIG. 3A is a schematic cross sectional diagram showing the part in the vicinity of the second support column 40 with the dimensions closer to actual size, and FIG. 3B is a plan diagram as viewed in the direction A-A of FIG. 3A. In FIG. 3A, components normally provided on the TFT substrate 10 other than the flattened film 109 are omitted, so that the figure is simplified. In addition, the overcoat film OC and the like normally provided on the facing substrate 20 are also omitted, so that the figure is simplified. In FIGS. 3A and 3B, the film thickness of the flattened film 109 is 1 μm to 3 μm. The contact hole 50 is created in the flattened film 109, and the diameter of the contact hole 50 is 20 μm to 30 μm at the rim and the diameter of the bottom 502 of the contact hole approximately 10 μm. Thus, the contact hole 50 is in truncated, conical form.

The diameter of the second support column 40 at the end 401 is approximately 10 μm, and the diameter of the second support column 40 at the base 402 is approximately 20 μm. There is a shift in position between the center of the second support column 40 and the center of the contact hole 50. As shown in FIG. 3B, the shortest distance d between the rim 501 of the contact hole and the end 401 of the second support column 40 is 5 μm or more as viewed in a plane. In the case where d is smaller than 5 μm, the second support column 40 and the flattened film 109 immediately make contact when pressure is applied to the facing substrate 20, and it becomes difficult to seal the liquid crystal cell under negative pressure, and it becomes easy for impact bubbles to be created after sealing the liquid crystal cell. Accordingly, in order to gain the effects of the present invention, it is necessary for there to be a second support column which makes the shortest distance d; shown in FIGS. 3A and 3B, 5 μm or more. There are many contact holes and second support columns 40 in the liquid crystal cell, and therefore, it is not necessary for all of the second support columns 40 to have a d of 5 μm or more. However, it is necessary for at least one, desirably more than half, and more desirably all of the second support columns, to have a d of 5 μm or more.

In this state, the distance h3 between the end 401 of the second support column 40 and the bottom 502 of the contact hole is 0.3 μm to 3 μm, preferably 0.5 μm to 1 μm. When the distance between the end 401 of the second support column 40 and the bottom 502 of the contact hole is large, the repulsive force can gradually increase in response to the degree of pressure from the outside. That is to say, the positional relationship between the second support column 40 and the contact hole 50 differs depending on the location, due to the inconsistency in the manufacture. Thus, some second support columns 40 make contact with the side or the like of contact holes 50 when a certain pressure is applied to the facing substrate 20, and when the pressure against the facing substrate 20 further increases, other second support columns 40 make contact with the side or bottom of contact holes 50.

Here, the value of h3 is determined by the thickness of the flattened film 109 and the degree to which the first support column 30 is compressed when the liquid crystal is sealed under negative pressure. In addition, the contact hole 50 is in truncated, conical form, and the angle of taper of the side and the depth of the contact hole 50 can be set, and therefore, it becomes possible to design the contact hole so that a repulsive force starts being created from the second support column 40 when the facing substrate 20 or the TFT substrate 10 bends to a certain degree as a result of pressure from the outside.

The degree to which the facing substrate 20 is pressed in order to increase the repulsive force is determined by the degree of shift in position between the second support column 40 and the center of the contact hole 50. Hereinafter, though a case where pressure is applied to the facing substrate 20 and a case where the facing substrate are pressed is described, these are the same as a case where pressure is applied to the TFT substrate 10 and a case where the TFT substrate 10 is pressed. FIGS. 4 and 5 show the difference in time when a repulsive force is applied to the second support column 40 due to the difference in the degree of the shift in position between the second support column 40 and the contact hole 50.

Figure 4A:
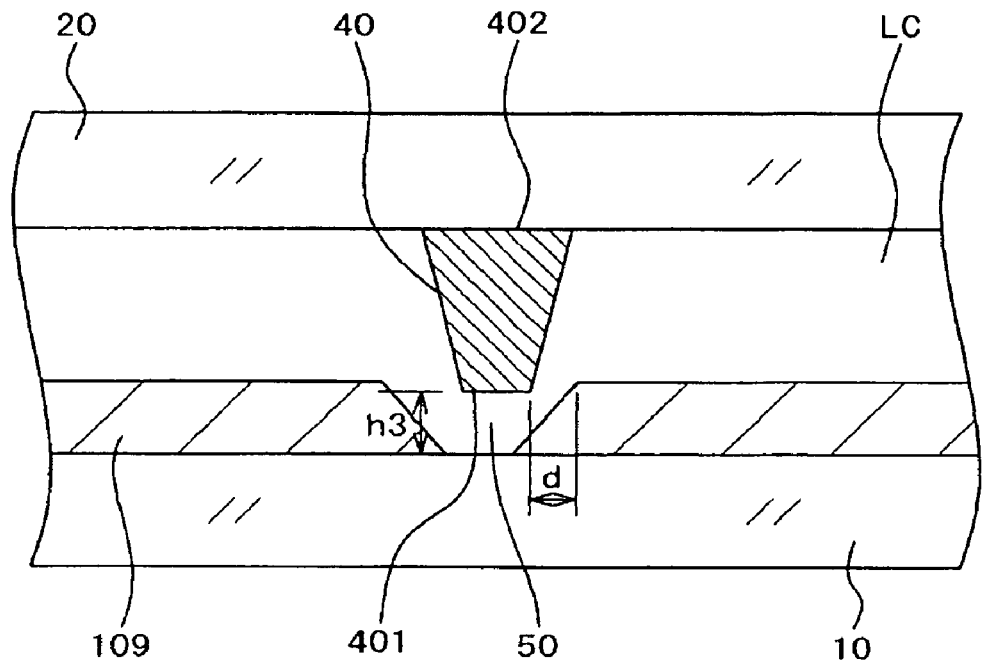
FIGS. 4A and 4B are a cross sectional diagram showing an embodiment of the present invention.
Figure 4B:
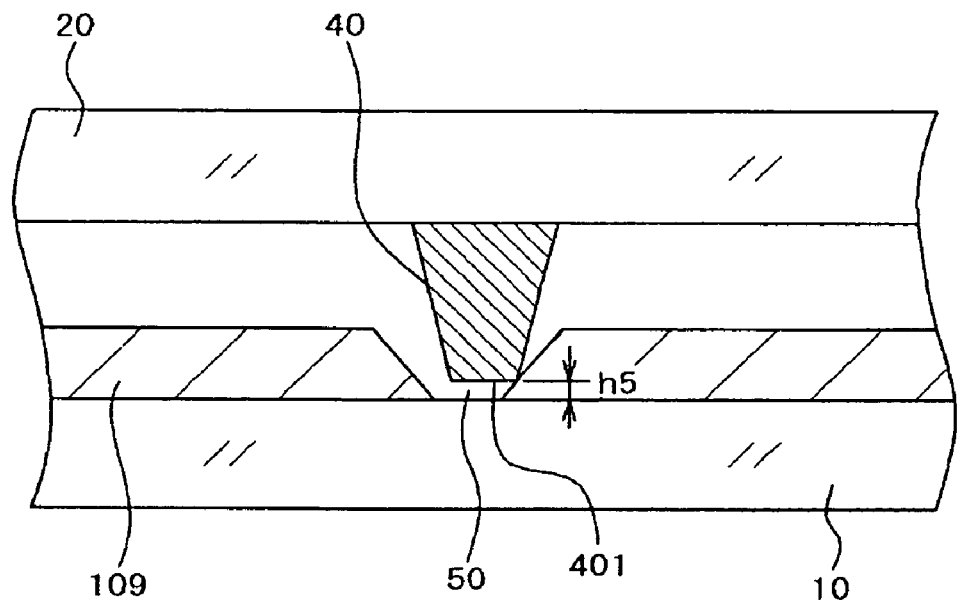

FIGS. 4A and 4B show the state of the facing substrate 20 when receiving pressure from the outside and when not receiving pressure in the case where the shortest distance between the end 401 of the second support column 40 and the rim 501 of the contact hole is d as viewed in a plane. FIG. 4A shows a state where the facing substrate 20 is not receiving pressure from the outside as in FIG. 3A. In this state, the distance between the bottom 502 of the contact hole and the end 401 of the second support column 40 is h3.

FIG. 4B shows a case where the distance between the facing substrate 20 and the TFT substrate 10 is reduced when pressure is applied to the facing substrate 20 from the outside. In FIG. 4B, the second support column 40 makes contact with the side of the contact hole 50. In this case, the first support column 3, not shown, is compressed more than in the case in FIG. 4A by the amount (h3-h5). When the facing substrate 20 is further pressed in this state, the repulsive force is applied to the facing substrate 20 from the second support column 40. Accordingly, the distance between the facing substrate 20 and the TFT substrate 20 is prevented from becoming too small. In addition, the first support column 30 is prevented from collapsing when excessively compressed.

Figure 5A:
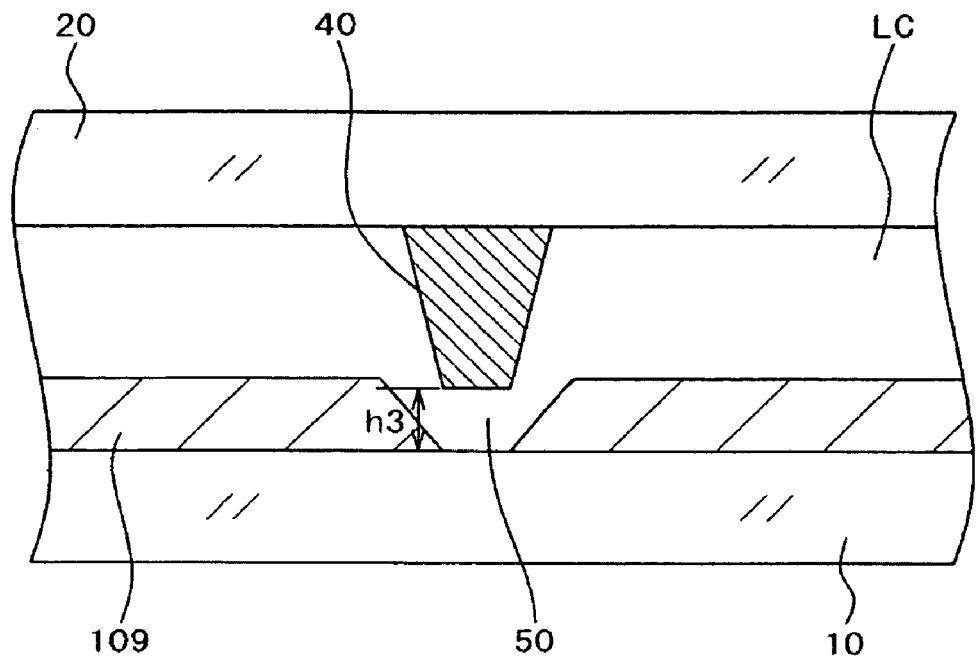
FIGS. 5A and 5B are a cross sectional diagram showing another embodiment of the present invention.
Figure 5B:
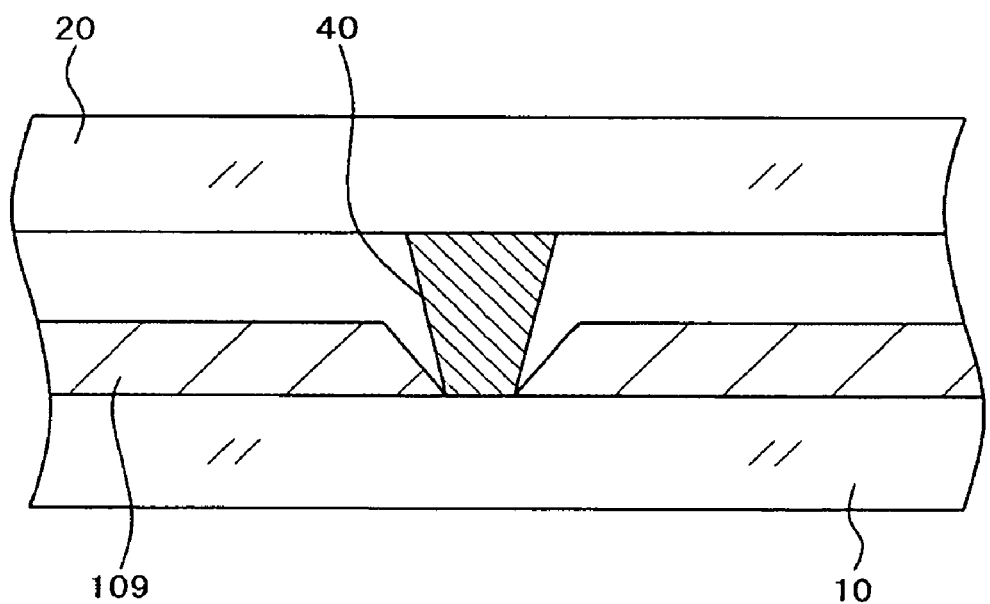

FIGS. 5A and 5B are a diagram showing a case where the facing substrate is receiving pressure from the outside and a case where it is not receiving pressure when the center of the second support column 40 and the center of the contact hole 50 coincide. FIG. 5A shows a case where the facing substrate 20 is not receiving pressure from the outside, and is different from FIGS. 3A and 4A only in that the center of the second support column 40 and the center of the contact hole 50 coincide. In this state, the distance between the end 401 of the second support column 40 and the bottom 502 of the contact hole is h3.

FIG. 5B shows a case where the distance between the facing substrate 20 and the TFT substrate 10 is reduced when pressure is applied to the facing substrate 20 from the outside. In this state, the first support column 30, not shown, is compressed by h3 more than in the case of FIG. 5A. In FIG. 5B, the second support column 40 makes contact with the bottom 502 of the contact hole. In this state, the repulsive force is applied from the second support column 40 when the facing substrate 20 is further pressed, and thus, the distance between the facing substrate 20 and the TFT substrate 10 is prevented from becoming too small, and the first support column 30 is prevented from collapsing.

As shown in FIGS. 4A, 4B, 5A and 5B, the point in time when the repulsive force is applied from the second support column 40 differs depending on the amount of shift in position between the second support column 40 and the center of the contact hole 50. The location of the second support column 40 and the location of the contact hole 50 differ, due to inconsistency in the manufacture. In addition, a great number of second support columns 40 and contact holes 50 are provided within the TFT cell. In addition, there exist various positional relationships between the second support columns 40 and the contact holes 50 even within the same liquid crystal cell, due to inconsistency in the manufacture. Thus, the repulsive force from the second support column 40 gradually increases when pressure is applied to the facing substrate 20 from the outside. That is to say, the repulsive force first appears from second support columns 40 where there is a great shift in location between the center of the contact hole 50 and the center of the second support column 40. After that, the repulsive force is applied from second support columns 40 where there is a small shift in location between the center of the contact hole 50 and the center of the second support column 40, and finally, the repulsive force is applied from second support columns 40 where the center of the contact hole 50 and the center of the second support column coincide.

As described above, the repulsive force gradually increases from the second support columns 40, and thus, the tolerance for error in the manufacture with sealing under negative pressure in accordance with the liquid crystal dropping and sealing method can be increased a great deal. That is to say, the distance between the facing substrate 20 and the TFT substrate 10 is kept constant only by the first support columns 30 when sealed under negative pressure, and therefore, it is easy to seal in the liquid crystal under negative pressure. Accordingly, the tolerance for error resulting from impact bubbles can be increased. Meanwhile, the repulsive force gradually increases from the outside when pressure is applied to the facing substrate 20 from the outside after the completion of the liquid crystal cell, and therefore, inconsistency in images due to variation in the distance between the facing substrate 20 and the TFT substrate 10 and the risk of the first support columns 30 collapsing can be reduced a great deal.

The principle of the present invention is described above, and the embodiments of the present invention are described in detail below following the structure of the actual liquid crystal cells.

First Embodiment

Figure 6:
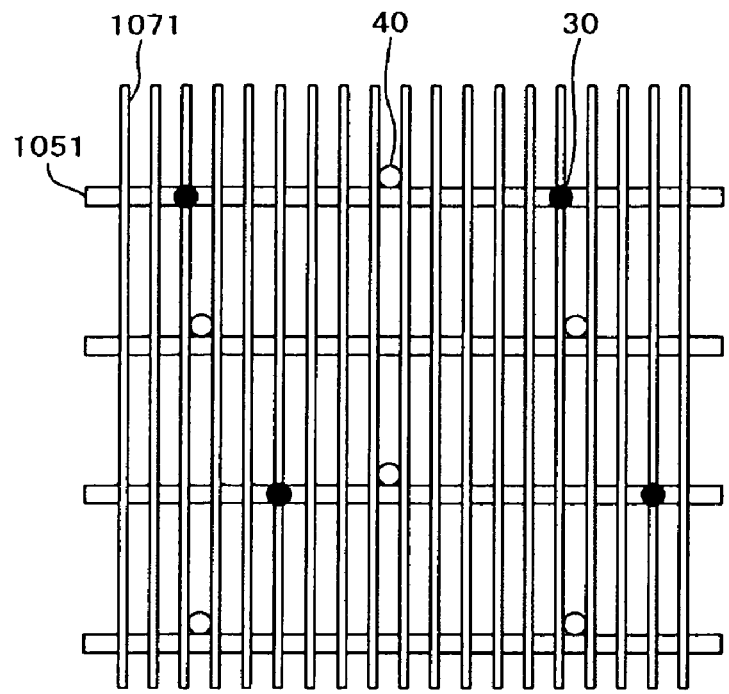
FIG. 6 is a plan diagram showing the location of the support columns on the TFT substrate.

FIG. 6 is a diagram showing the location where the first support columns 30 and the second support columns 40 are provided in the arrangement of the scanning lines and image signal lines on the TFT substrate 10. In FIG. 6, the scanning lines 1051 extend in the lateral direction and are aligned in the longitudinal direction. The video signal lines 1071 extend in the longitudinal direction over the scanning lines 1051 with an insulating film in between and are aligned in the lateral direction. FIG. 6 does not show TFT's.

In FIG. 6, the first support columns 30 are provided in portions shown by black dots. The first support columns 30 are formed on the facing substrate 20, and thus, the first support columns 30 simply make contact with the portions marked by black dots in FIG. 6. The portions marked by black dots are located at points where the scanning 1051 and the video signal lines 1071 cross. As shown in the following diagrams, a flattened film 109 is formed on the TFT substrate 10, and therefore, portions where the scanning lines 1051 and the video signal lines 1071 cross do not protrude much.

In FIG. 6, the circles are portions where the second support columns 40 are provided. The second support columns 40 are formed on the facing substrate 20, and thus, the second support columns 40 are located in the portions marked by circles in FIG. 6. In the portions marked by circles in FIG. 6, there are contact holes 50 in the flattened film 109, so that the second support columns 40 make contact with the side wall or the bottom of the contact holes 50 when the facing substrate 20 receives pressure.

Figure 7:
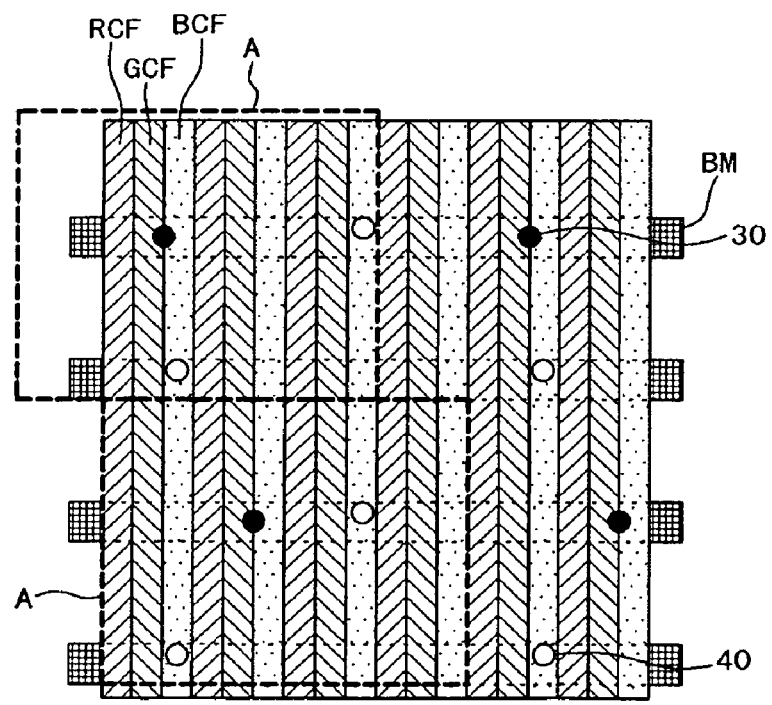
FIG. 7 is a plan diagram showing the location of the support columns on the facing substrate.

FIG. 7 shows the location where the first support columns 30 and the second support columns 40 are provided in the arrangement of a black matrix BM, red color filters RCF, green color filters GCF, blue color filters BCF and the like on the facing substrate 20. The first support columns 30 and the second support columns 40 are formed on the facing substrate 20. The support columns are formed by applying an acryl resin to the facing substrate 20 so that it has a necessary film thickness, and etching the acryl resin through photolithography so that the support column portions remain.

In FIG. 7, black dots indicate the location of the first columns 30 and circles indicate the location of the second support columns 40. The first support columns 30 and the second support columns 40 are both formed on the black matrix BM. This is so that the support column portions can be prevented from affecting images. The location in the longitudinal direction is different between the first support columns 30 and the second support columns 40 on the black matrix BM. This is because the first support columns 30 correspond to points where the scanning lines 1051 and the video signal lines 1071 cross on the TFT substrate 10, and the second support columns 40 correspond to the contact holes 50 in the flattened film 109 on the TFT substrate 10.

In FIG. 7, the region A has eight pixels. Each color filter, including the red color filter RCF, the green color filter GCF and the blue color filter BCF, indicates a sub-pixel, and three sub-pixels form one pixel. In FIGS. 6 and 7, one first support column 30 and two second support columns 40 are formed for every eight pixels. In the present embodiment, the number of second support columns 40 is greater than that of the first support columns 30, and thus, the invention has greater effects.

Figure 8:
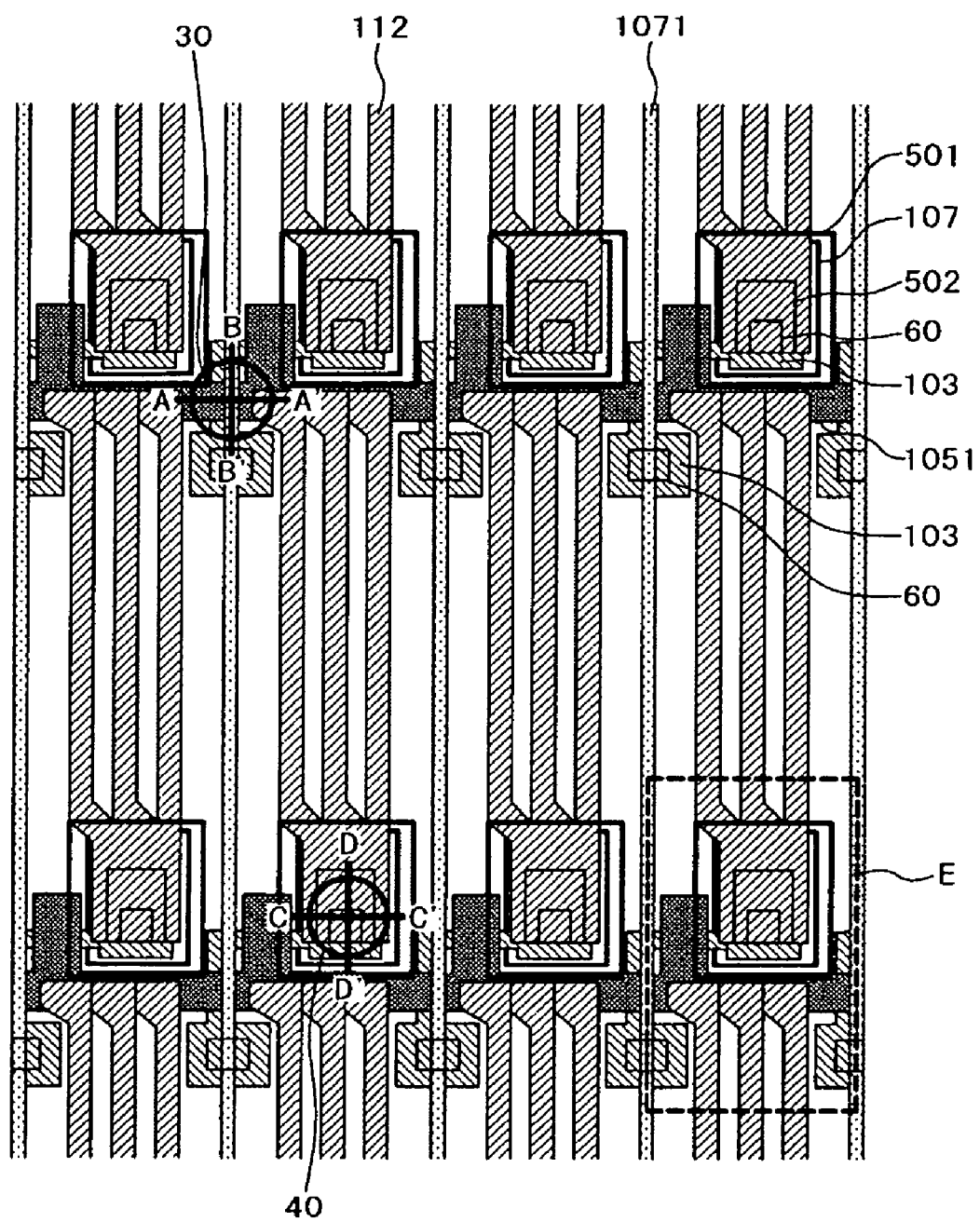
FIG. 8 is a plan diagram showing the TFT substrate in detail.

FIG. 8 is a plan diagram showing the components on the TFT substrate 10 and the positional relationship between the first support columns 30 and the second support columns 40. FIG. 8 shows the TFT substrate 10 in an IPS (in-plane switching) type liquid crystal display device. In FIG. 8, each region surrounded by scanning lines 1051 and video signal lines 1071 is a sub-pixel. In FIG. 8, a pixel electrode 112 and a TFT is formed within each sub-pixel. The width of the sub-pixels is approximately 40 μm, and the length is approximately 120 μm. Meanwhile, even the shorter diameter of the rim 501 of the contact holes created in the flattened film 109 is approximately 20 μm 30 μm. Accordingly, the area of the contact holes 50 in the flattened film 109 occupies a great ratio of the sub-pixels.

As shown in FIG. 8, the first support columns 30 are provided at points where the scanning lines 1051 and the video signal lines 1071 cross. Meanwhile, the second support columns 40 are provided within the contact holes 50 created in the flattened film 109. In FIG. 8, the contact holes 50 are rectangular. Here, FIG. 8 is a design drawing, and the corners of actual contact holes 50 are rounded, and thus, the form is close to a circle or an ellipsis in actual products. In FIG. 8, the rectangles 501 are the rim of the contact holes 50, and the rectangles 502 are the bottom of the contact holes 50. In addition, smaller quadrilaterals 60 are SD contact holes 60 for electrical connection between the source/drain electrodes (SD electrodes 107) of the TFT's and the pixel electrodes 112.

Figure 9:
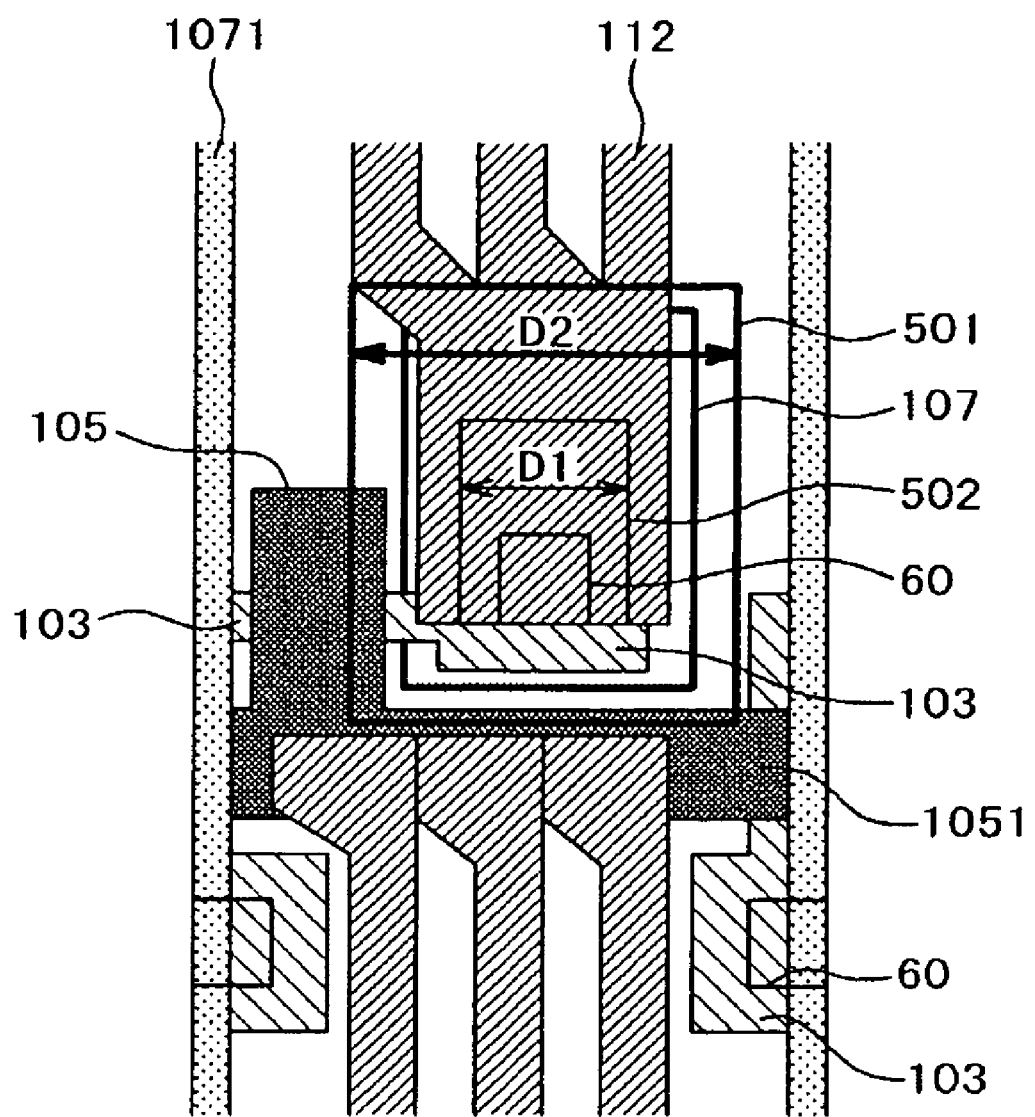
FIG. 9 is a plan diagram showing an enlargement of part of FIG. 8.

FIG. 9 is a diagram showing an enlargement of the portion E in FIG. 8. The shorter side D2 of the rectangle 501 showing the rim 501 of the contact hole has a length of 20 μm to 30 μm. Meanwhile, the shorter side D1 of the rectangle 502 showing the bottom 502 of the contact hole is approximately 10 μm. A second support column 40 is located somewhere inside the rectangle 501. In FIG. 9, an SD electrode 107 is formed beneath the pixel electrode 112 with the passivation film (insulating film) 108 and the flattened film 109 sandwiched in between, and an SD contact hole 60 is created for electrical connection between the SD electrode 107 and the pixel electrode 112. The SD electrode 107 is in rectangular form and relatively large.

In FIG. 9, two TFT's are formed in series beneath the video signal line 1071 and the pixel electrode 112. One of the TFT's is formed of the semiconductor layer 103 and the gate electrode 105 on the left side of the contact hole 50, while the other is hidden beneath the video signal line 171. That is to say, a semiconductor layer 103 is formed beneath the video signal line 1071 so as to be parallel to the video signal line, and the scanning line 1051 works as the gate electrode 105 and forms a TFT.

In FIGS. 8 and 9, slits are created in the pixel electrode 112, so that the pixel electrode 112 has linear portions. In addition, a common electrode (facing electrode) 110, not shown, is formed in a plane beneath the pixel electrode 112 with an interlayer insulating film 111, not shown, intervening in between. Thus, an electrical field is generated by the difference in potential between the pixel electrode 112 and the common electrode 110, so that liquid crystal LC is controlled.

Figure 10A:
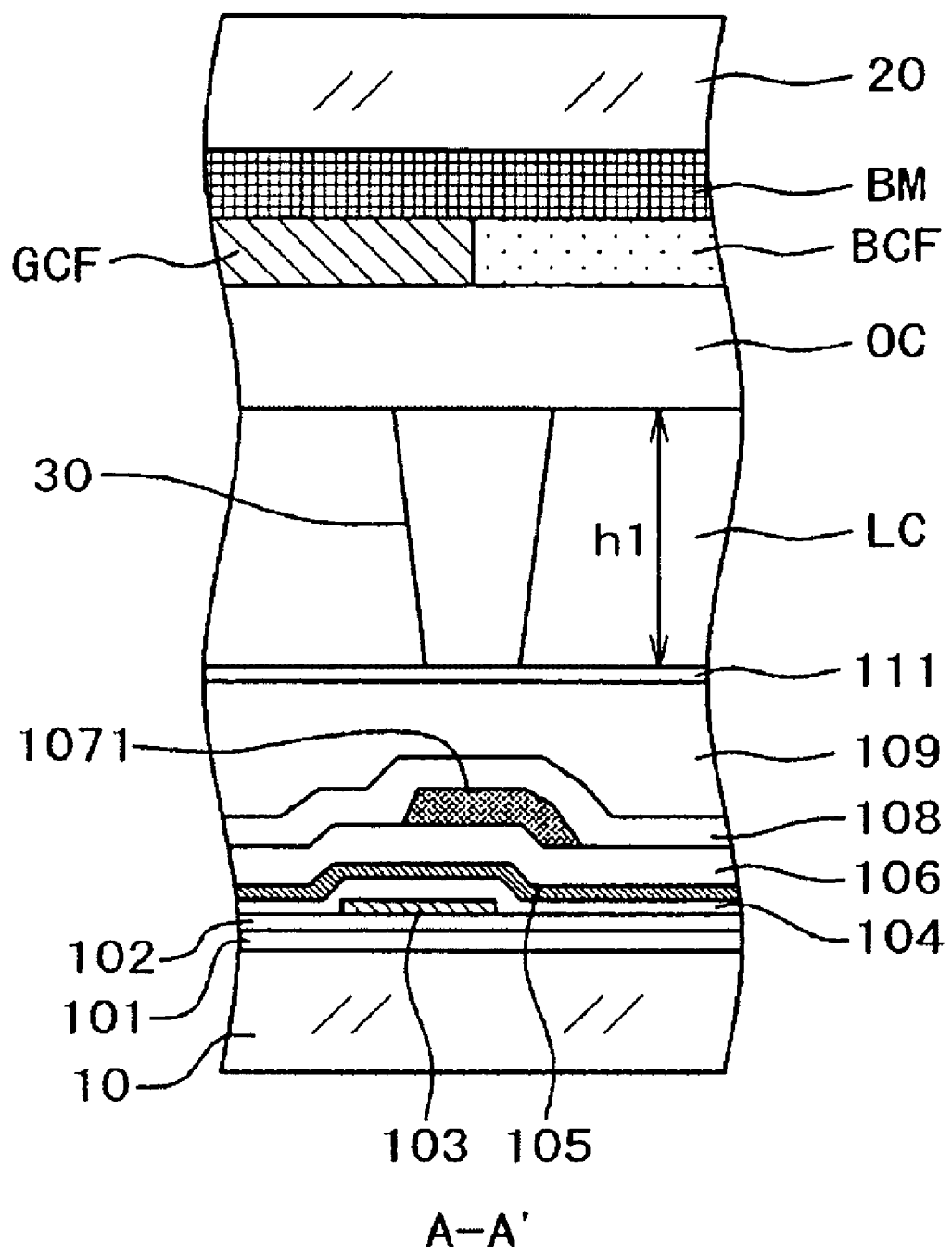
FIGS. 10A and 10B are a cross sectional diagram showing a portion of the liquid crystal display device in the vicinity of a first support column.
Figure 10B:
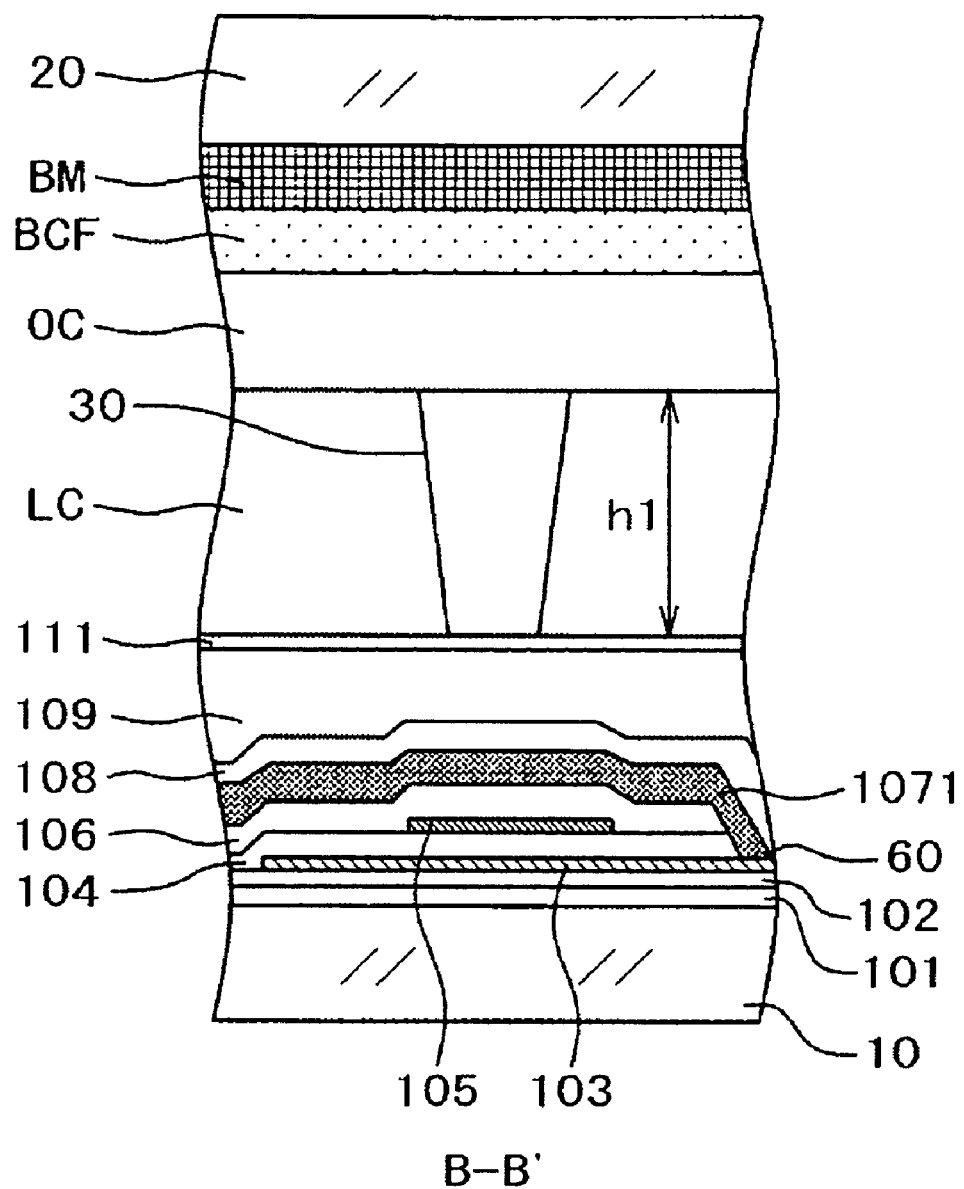

FIGS. 10A and 10B are a cross sectional diagram showing the facing substrate 20 and the TFT substrate 10 in a portion where the first support column 30 in FIG. 8 is provided. FIG. 10A is a cross sectional diagram along A-A' in FIG. 8. In FIG. 10A, a first base film 101 made of SiN and a second base film 102 made of $SiO_2$ are formed on the TFT substrate 10. These are provided in order to block impurities from the glass substrate. A semiconductor layer 103 which is an active layer for the TFT is formed on the second base film 102. A gate electrode 105 is formed above the semiconductor layer 103 with a gate insulating film 104 made of $SiO_2$ sandwiched in between, and a scanning line 1051 is also used as the gate electrode 105 in this case. An interlayer insulating film 106 made of $SiO_2$ is formed on the gate electrode 105 and an SD electrode 107 is formed on top of this, and a video signal line 1071 is also used as the SD electrode 107 in this case. A passivation film 108 which covers the SD electrode 107 so as to protect the entirety of the TFT is formed of an SiN film. A flattened film 109 is formed of an acryl resin on top of the passivation film 108. The film thickness of the flattened film 109 is as thick as approximately 1 μm to 3 μm. An interlayer insulating film 111 is formed of SiN on top of the flattened film 109 so as to insulate the common electrode 110, not shown, from the pixel electrode 112, not shown. There are no pixel electrodes or common electrodes 110 in the cross sectional portion along A-A', and therefore, only the interlayer insulating film 111 appears.

In FIG. 10A, a black matrix BM is formed on the facing substrate 20, and a green color filter GCF and a blue color filter BCF are formed on top of this. The first support column 30 is formed on the BM, and therefore, the black matrix BM is located beneath a color filter. In the pixel portion, there is a window in the black matrix BM, and a color filter is formed directly on the facing substrate 20. In FIG. 10A, an overcoat film OC is formed on top of the color filter and the first support column 30 is formed on top of this. The distance h1 between the TFT substrate 10 and the facing substrate 20 is controlled by the first support column 30. Liquid crystal is sealed in under negative pressure, and therefore, the first support column 30 is already compressed at this point in time. That is to say, the original height of the first support column 30 is slightly greater than h1.

FIG. 10B is a cross sectional diagram along B-B' in FIG. 8. The layer structure of the TFT is the same as in FIG. 10A, though the location of the cross section is different. In FIG. 10B, the configuration of the TFT is shown in more detail. Though the layer structure of the facing substrate 20 in FIG. 10B is basically the same as in FIG. 10A, FIG. 10B shows only a blue color filter BCF, because of the location of the cross section.

Figure 11A:
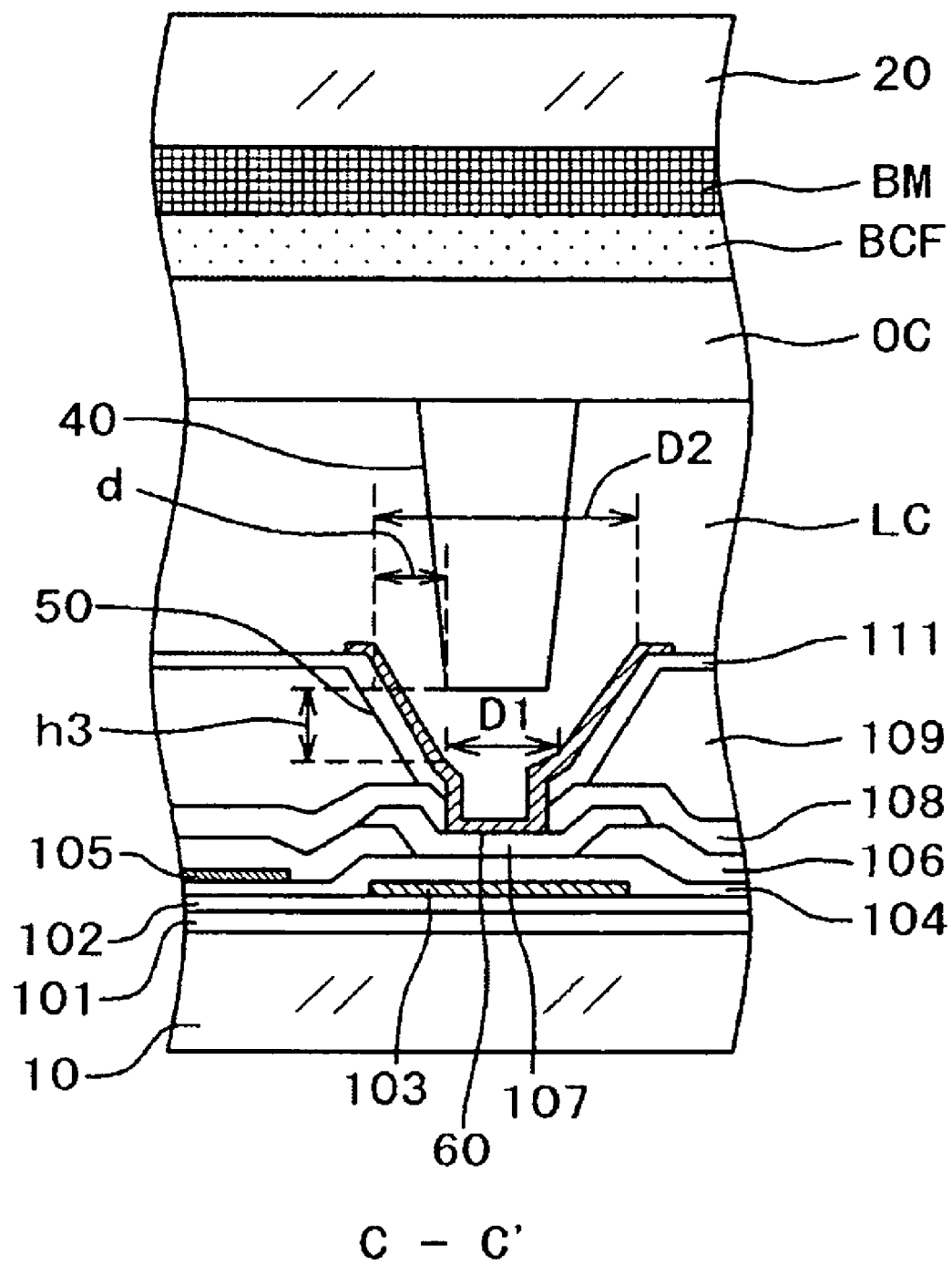
FIGS. 11A and 11B are a cross sectional diagram showing a portion of the liquid crystal display device in the vicinity of a second support column.
Figure 11B:
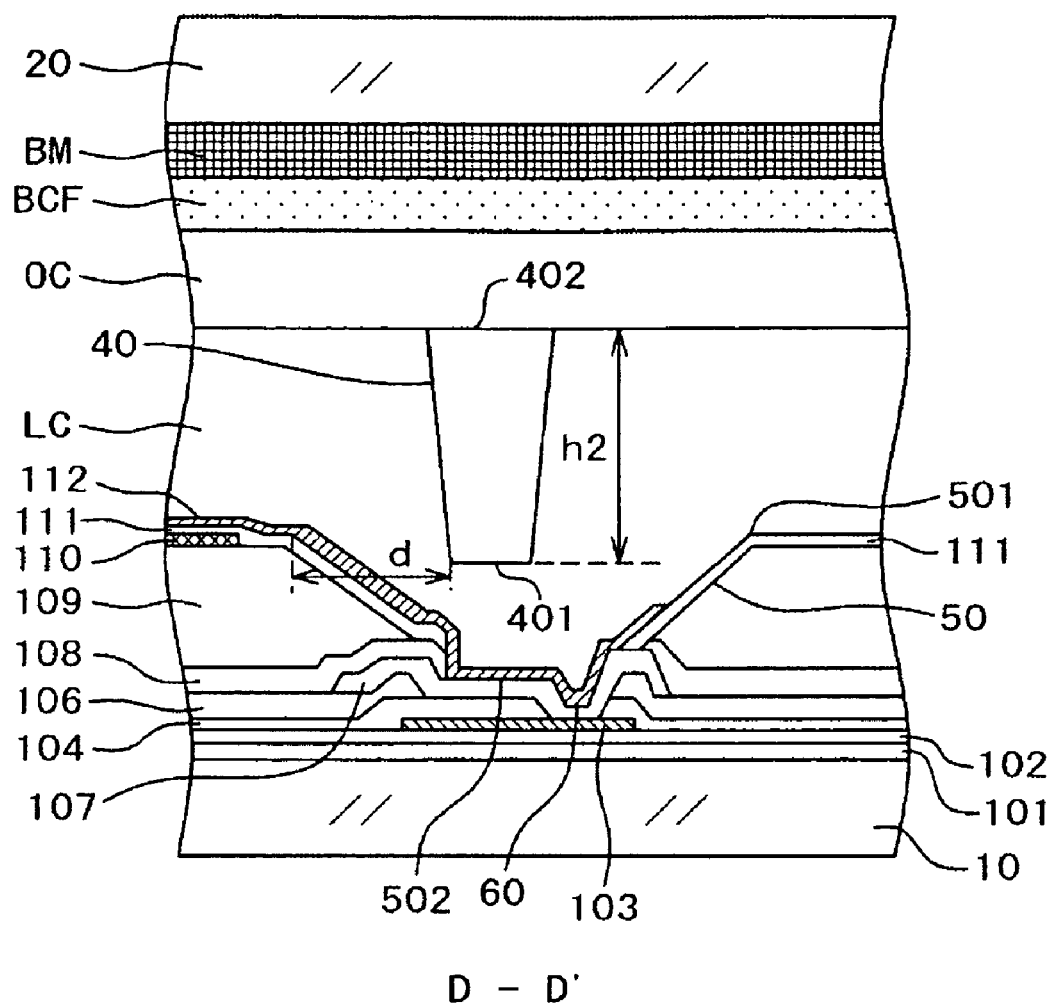

FIGS. 11A and 11B are a cross sectional diagram showing the facing substrate 20 and the TFT substrate 10 in a portion where the second support column 40 in FIG. 8 is provided. A contact hole 50 is created in a flattened film 109 on the TFT substrate 10 in a portion corresponding to the second support column 40. FIG. 11A is a cross sectional diagram along C-C' in FIG. 8. Though no TFT is formed in the cross section, the semiconductor layer 103, which is the same layer as the active layer of the TFT's, extends over the TFT substrate 10 shown in FIG. 11A. Though the layer structure is basically the same as in FIG. 10A, there is a difference, in that a contact hole 50 is created in the flattened film 109 in FIG. 11A, and in addition, an interlayer insulating film 111 is formed on top of the flattened film 109, and a pixel electrode 112 is formed on top of this.

In FIG. 11A, an SD contact hole 60 is created in the passivation film 108, so that the SD electrode 107 and the pixel electrode 112 are electrically connected. The flattened film 109 is thick, and therefore, the diameter of the rim 501 of the contact hole 50 is great, so that the angle of the taper of the contact hole is small. In FIG. 11A, the configuration of the facing substrate 20 is the same as in FIG. 10B. The second support column 40 provided on the overcoat film OC on the facing substrate 20 is inserted into the contact hole 50. The height of the second support column 40 is h2, which is greater than h1 shown in FIGS. 10A and 10B. The height of the first support column 30 shown in FIGS. 10A and 10B in an uncompressed state is h2, which is the same as the height of the second support column 40. That is to say, the first support column 30 in FIGS. 10A and 10B is compressed by (h2-h1).

In FIG. 11A, the shortest distance d between the end 401 of the second support column 40 and the rim 501 of the contact hole is 5 μm or more in a plan view. In addition, the distance h3 between the end 401 of the second support column 40 and the bottom 502 of the contact hole is 0.3 μm to 3 μm, preferably 0.5 μm to 1 μm. In FIG. 11A, the diameter d2 of the contact hole at the rim 501 is 20 μm to 30 μm, while the diameter d1 of the contact hole at the bottom 502 is approximately 10 μm. Here, in FIG. 11A, a contact hole having a small diameter created beneath the contact hole 50 is an SD contact hole 60.

FIG. 11B is a cross sectional diagram along D-D' in FIG. 8. Though the structure of the TFT substrate 10 in the cross section shown in FIG. 11B is basically the same as the structure shown in FIG. 11A, a state where the SD electrode 107 is connected to the semiconductor layer 103 via the SD contact hole 60 created in the gate insulating film 104 is shown. In addition, in FIG. 10B, a common electrode 110 is formed on top of the flattened film 109. An interlayer insulating film 111 is formed on top of the common electrode 110, and a pixel electrode 112 is formed on top of this. The common electrode 110 is formed of a transparent conductive film in plane form. Meanwhile, the pixel electrodes 112 are formed in stripes at certain intervals, as shown in FIG. 8. The pixel electrodes 112 are formed of a transparent conductive film. When a voltage is applied between the pixel electrodes 112 and the common electrodes 111, the liquid crystal molecules rotate under the influence of an electrical field in the lateral direction, so that an image is formed through the control of light from the backlight.

In FIG. 11B, the configuration of the facing substrate 20 in a cross section is the same as in FIG. 11A. In addition, second support columns 40 are formed on the overcoat film OC on the facing substrate 20. The shortest distance d between the rim 501 of the contact hole and the end 401 of the second support column 40 is 5 μm or more as viewed in a plane. In addition, when pressure is applied to the facing substrate 20 and the facing substrate 20 is pressed, the second support column 40 makes contact with the side wall of the contact hole 50 or the bottom 502 of the contact hole 50, so that a repulsive force is created from the second support column 40.

Though in the above description, an orientation film is formed on the surface of the TFT substrate 10 and the facing substrate 20 which makes contact with the liquid crystal LC, it is not shown in the figures. In addition, no phase difference plate, polarizing plate or the like is shown in the figures.

Though in the description of the above embodiment, the first support columns 30 and the second support columns 40 have the same thickness, it is not necessary for the thickness of the first support columns 30 and the second support columns 40 to be the same. It is better for the first support columns 30 not to be inserted into the contact holes 50 in the flattened film 109. Therefore, it is better for the first support columns 30 to be thicker. It is also better for the second support columns 40 to be easy to insert into the contact holes 50. Therefore, it is better for the second support columns 40 to be thinner. Accordingly, in some cases it is better for the diameter of the first support columns 30 to be greater than the diameter of the second support columns 40. The first support columns 30 and the second support columns 40 are both formed by etching the same acryl based resin through photolithography. The mask used for photolithography can only be changed in order to change the thickness of the support columns, and thus, the cost for manufacture does not increase.

Though in the above embodiment, a case where the number of second support columns 40 is greater than the number of first support columns so that the effects of the present invention are greater is described, the invention is not limited to this, and the number of second support columns 40 and the number of first support columns may be the same, of the number of second support columns may be smaller than the number of first support columns 30, depending on the required properties.

As described above, according to the embodiments, the first support columns 30 make contact with the TFT substrate 10 and the second support columns 40 are located in portions corresponding to the contact holes 50 created in the flattened film 109, so that liquid crystal can be sealed in easily under negative pressure. In addition, the distance between the TFT substrate 10 and the facing substrate 20 can be prevented from becoming too small by gradually increasing the repulsive force from the second support columns when the facing substrate 20 is pressed, and thus, inconsistency in images can be prevented and the first support columns 30 can be prevented from collapsing, so that a liquid crystal display device having high reliability can be implemented.

What is claimed is:

1. A liquid crystal display device, comprising a first substrate, a second substrate and liquid crystal sandwiched between said first substrate and said second substrate, characterized in that said first substrate has contact holes in truncated, conical form, said second substrate has first support columns and second support columns, said first support columns make contact with said first substrate, said second support columns do not make contact with said first substrate, the end of at least one of said second support columns is located within said contact hole in a plan view and the minimum distance between the end of the second support column and the rim of the contact hole is 5 μm or more in a plan view, the distance between the end of said second support column and the bottom of said contact hole is 0.3 μm to 3 μm, and the diameter of said first support columns is greater than the diameter of said second support columns.

2. The liquid crystal display device according to claim 1, characterized in that the distance between the end of said second support column and the bottom of said contact hole is 0.5 μm to 1 μm.

3. The liquid crystal display device according to claim 1, characterized in that the number of said second support columns is greater than the number of said first support columns.

4. The liquid crystal display device according to claim 1, characterized in that said second support columns make contact with the side or the bottom of said contact holes when said first substrate or said second substrate receives pressure from the outside.

5. A liquid crystal display device, comprising a first substrate, a second substrate and liquid crystal that is sealed in between said first substrate and said second substrate in accordance with a liquid crystal dropping and sealing method, characterized in that said first substrate has contact holes in truncated, conical form, said second substrate has first support columns and second support columns, said first support columns make contact with said first substrate, said second support columns do not make contact with said first substrate, the end of at least one of said second support columns is located within said contact hole in a plan view and the minimum distance between the end of the second support column and the rim of the contact hole is 5 μm or more in a plan view, the distance between the end of said second support column and the bottom of said contact hole is 0.3 μm to 3 μm, and the height of said second support columns is greater than the distance between said first substrate and said second substrate.

6. The liquid crystal display device according to claim 5, characterized in that said first support columns are in such a state as to be compressed by said first substrate and said second substrate.

7. The liquid crystal display device according to claim 5, characterized in that the distance between the end of said second support columns and the bottom of said contact holes is 0.5 μm to 1 μm.

8. The liquid crystal display device according to claim 5, characterized in that the number of said second support columns is greater than the number of said first support columns.

9. The liquid crystal display device according to claim 5, characterized in that said second support columns make contact with the side or the bottom of said contact holes when said first substrate or said second substrate receives pressure from the outside.

10. A liquid crystal display device, comprising a first substrate, a second substrate and liquid crystal that is sealed in between said first substrate and said second substrate in accordance with a liquid crystal dropping and sealing method, characterized in that said first substrate has contact holes in truncated, conical form, said second substrate has first support columns and second support columns, said first support columns make contact with said first substrate, said second support columns do not make contact with said first substrate, the end of at least one of said second support columns is located within said contact hole in a plan view and the minimum distance between the end of the second support column and the rim of the contact hole is 5 μm or more in a plan view, the distance between the end of said second support column and the bottom of said contact hole is 0.3 μm to 3 μm, and the diameter of said first support columns is greater than the diameter of said second support columns.

\* \* \* \* \*